March 15, 1938.　　　O. E. ROBBINS　　　2,111,299

MAGNETIC SINE TABLE

Filed Jan. 22, 1937　　　2 Sheets-Sheet 1

INVENTOR.
OMER E. ROBBINS
BY Edward M. Apple
ATTORNEY.

March 15, 1938.  O. E. ROBBINS  2,111,299
MAGNETIC SINE TABLE
Filed Jan. 22, 1937  2 Sheets-Sheet 2

INVENTOR.
OMER E. ROBBINS
BY Edward M. Apple
ATTORNEY.

Patented Mar. 15, 1938

2,111,299

UNITED STATES PATENT OFFICE 2,111,299

MAGNETIC SINE TABLE

Omer E. Robbins, Detroit, Mich.

Application January 22, 1937, Serial No. 121,875

3 Claims. (Cl. 90—59)

This invention relates to means for holding objects for machining and other operations, and has particular reference to a magnetic sine table, adapted to hold objects made of magnetic materials. It can also be used to hold non-ferrous objects by the use of ferrous adapters in which the work is placed.

The principal object of the invention is the provision of a device of the character referred to, which may be effectively employed to hold objects for grinding, honing, lapping, machining, inspecting, checking or similarly working flat surfaces, radii holes, bevels, chamfers, etc., which may be angularly spaced relative to the base surface.

Another object of the invention is the provision of a device which may be quickly set at the required angle (either simple or compound), thereby effecting a large saving in the time consumed for the setting up procedure.

A further object of the invention is the provision of a magnetic sine table of great accuracy.

Heretofore it has been customary to use a sine plate, or two angle plates clamped together and tilted to the proper angle. The work was then clamped to the plate by means of bolts, clamps, or similar means. With this method, considerable difficulty is generally experienced in setting the angle plate at the predetermined angle, particularly in the case of compound angles, in which instance much time is wasted and the angle set up is likely to be inaccurate. Furthermore, the clamping of the work to the plate creates local strains in the vicinity of the clamps or bolts, and causes distortion in all but the very thickest sections. Under these conditions it is all but impossible to secure flat true sections and accurate work.

The present invention obviates the above named disadvantages by utilizing a precision sine table equipped with an electromagnet to hold the work in place. The table can be readily and quickly set at any angle, and the angle so formed is extremely accurate. The work, when once located, can be securely clamped in place by merely turning a switch to actuate the electromagnet. There are no screws or nuts to tighten and loosen, and no clamps to interfere with the subsequent operations or to distort the article to be worked. In addition, the magnetic flux in the electromagnet can be gradually increased from zero to maximum by means of a rheostat, thereby facilitating the production of true surfaces on very thin sections, Another advantageous feature of the invention is that it may be built to scientific standards for use as a precision tool in laboratories, or it may be built to produce angles of moderate accuracy for commercial use. Its general adaptability will enable it to compete in this field.

Other objects and advantages of the invention will appear as the description proceeds.

The invention resides in the improved construction of the magnetic sine table, and in the combination and arrangement of parts, the novelty of which will be particularly pointed out and distinctly claimed hereinafter.

In the accompanying drawings, which constitute part of my disclosure, I have fully and clearly illustrated a preferred embodiment of the invention, in which drawings.

Figure 1:
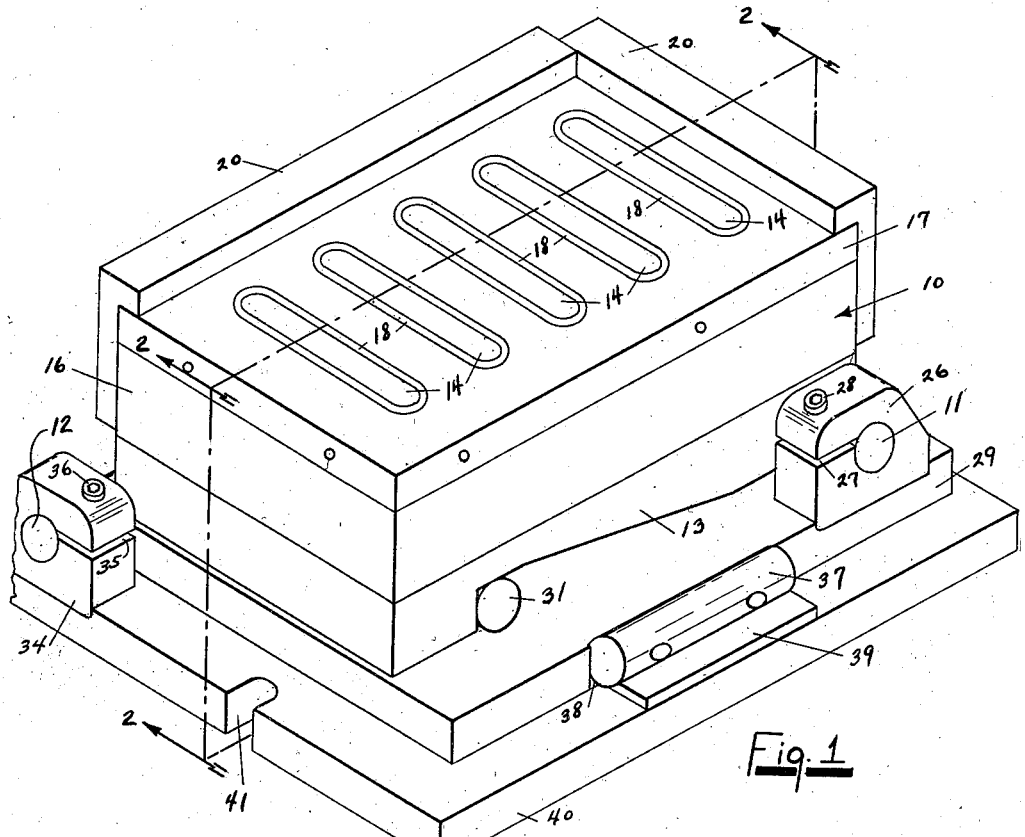
Fig. 1 is a perspective view of a device embodying my invention.

Referring now more particularly to the drawings, it will be seen that in the embodiment herein disclosed, my device comprises an electromagnetic table which is designated generally by the reference character 10, and which is arranged to be tiltable in one direction about the axis of the transverse pivot roller 11, and also in a direction at right angles to the first named direction by means of a longitudinal pivot roller 12.

Figure 2:
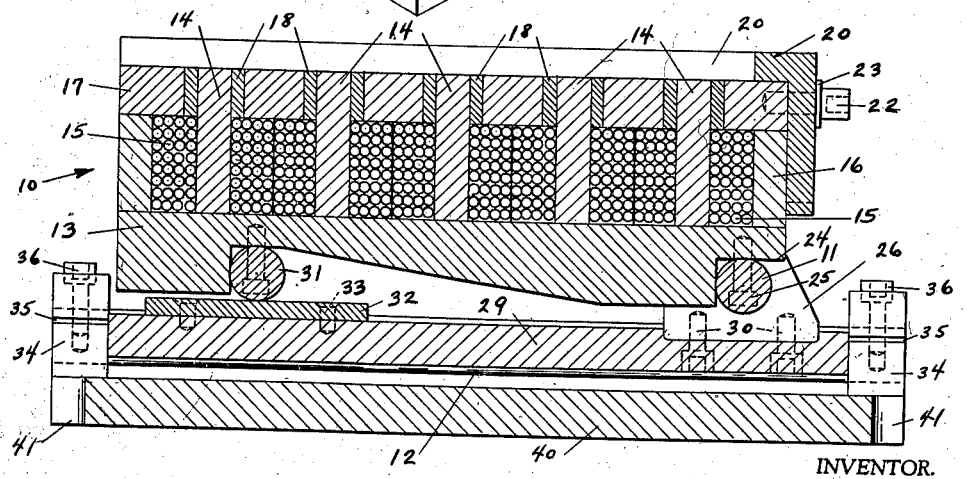
Fig. 2 is a sectional view taken substantially on the plane indicated by the lines 2—2—2 of Fig. 1.

The details of the table 10 are clearly shown in Fig. 2, wherein the numeral 13 refers to the base member of the table. Rigidly mounted upon the base 13 are a plurality of cores 14 about which are wound the coils 15 of the electromagnet unit. Side members 16 enclose the coils 15, and a top plate 17 is placed thereabove, forming a level surface for the top of the table 10. A space is left around the periphery of the cores 14 at their upper extremities into which is babbitted the lead fillers 18. The entire assembly is secured together by any suitable means, and the top surface thereof is machined to form a flat true surface upon which the object to be held is placed.

Figure 3:
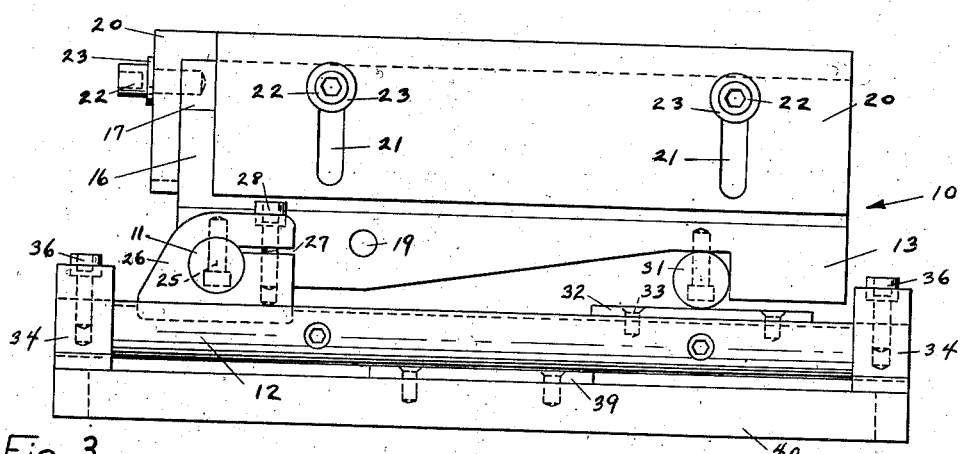
Fig. 3 is a rear elevation of the device shown in Fig. 1.

The coils 15 are connected to a direct current power outlet by means of a cable (not shown)

which may be brought out of the table through the hole 19 (Fig. 3). In the event that direct current electricity is not available, the device may be operated from an alternating current supply through the medium of a motor-generator set or other rectifying means. It is advisable to insert a rheostat in the circuit to enable the strength of the electromagnet to be varied to suit the particular requirements of the job being held on the table. With this arrangement extremely thin sections may be clamped on the table without distortion by gradually increasing the power supply to the coils 15.

The table 10 is equipped with the guide rails 20 which are positioned at one end of said table. The rails 20 are L shaped members having their shorter legs projecting over the top of the table 10 to enable them to serve as guides and stops for objects held thereon. Slots 21 are formed in the vertical legs of the rails 20 and enable the rails to be adjusted to various heights to accommodate a wide variety of different sizes of objects. The aforesaid rails 20 are fastened to the table 10 by means of the bolts 22 which pass through the slots 21 and threadedly engage the top plate 17 of the table. Washers 23 are placed intermediate the rails 20 and the heads of the bolts 22, the latter having hexagonal shaped holes in the outer ends thereof to enable them to be readily tightened or loosened by means of a suitable wrench.

As hereinabove mentioned, the table 10 is arranged to tilt in two directions, to enable it to be set at any required simple or compound angle. This is accomplished by rotating the table about a roller pivoted upon an intermediate base, which in turn is adapted to rotate about a secondary roller pivoted upon a secondary base or platform the latter being held horizontal. As clearly shown in Fig. 2, a notch 24 is cut transversely across the lower edge of one end of the table 10, and a cylindrical roller 11 is fixedly secured therein by means of the bolts 25. The ends of the roll 11 extend beyond the sides of the table 10 (Fig. 1) and are pivoted in the brackets 26. A transverse slot 27 (Fig. 1) is cut in one end of the bracket 26 and a stud bolt 28 passed therethrough. This arrangement permits the bolt 28 to be loosened by means of a suitable wrench when it is desired to tilt the table and also enables the table to be firmly locked in any desired position by simply retightening the bolt 28 and thereby clamping the roller 11 in the hole in the bracket 26. The brackets 26 (Fig. 2) are fastened to the intermediate base 29 by means of the bolts 30.

In order to provide a simple, rapid and accurate method for setting the table 10 at any desired angle with respect to the intermediate base 29, I have positioned a roller 31 on the underneath side of the table 10, as illustrated in Figs. 1 and 2. An offset is formed on the underside of said table 10 to enable the roller 31 to be mounted so that its axis is both parallel to the axis of the roller 11 and also in the same horizontal plane. In other words, by using identical rollers 11 and 31, by fixedly securing them to the table 10 an equal distance from the top surface of said table, and by having a standard distance between the axes of the two rollers, it can be readily seen that the angle of the top of the table is determined by the distance the free, or unpivoted, roller 31 is raised from its normal level or zero angle position. In the present instance this is accomplished by the insertion of standard gauge blocks under the roller 31. In the zero angle position the roller 31 (Fig. 2) rests upon a 0.100 inch gauge block 32, which is removably secured to the intermediate base 29 by the screws 33. At the present time, gauge blocks of the type which it is intended to employ, are furnished in variations of one one-thousandth of an inch, beginning with a smallest size of 0.100 inch. Thus to set the table at very small angles requiring the roller 31 to be raised less than 0.100 inch, it is only necessary to remove the block 32 and replace it with a block exceeding the required height by 0.100 inch. Without this arrangement it would be impossible to use the table for small angles, which operation is very simple with my device, thus constituting an important advantage thereof.

The actual setting of the table at the predetermined angle is accomplished by the operator quickly and accurately.

Knowing the distance between the axes of the rollers 11 and 31, which is preferably a standard distance such as five or ten inches for easy calculation, the operator consults a table containing the sines of angles, and by a simple trigonometric formula determines the size of the gauge block which must be inserted under the roller 31 to tilt the table 10 to the required angle. Because the rollers 11 and 31 have equal radii they cancel each other and do not enter into the calculation of the angle. They do, however, serve the important function of maintaining an exact and constant distance between their operating edges at all times.

Figure 4:
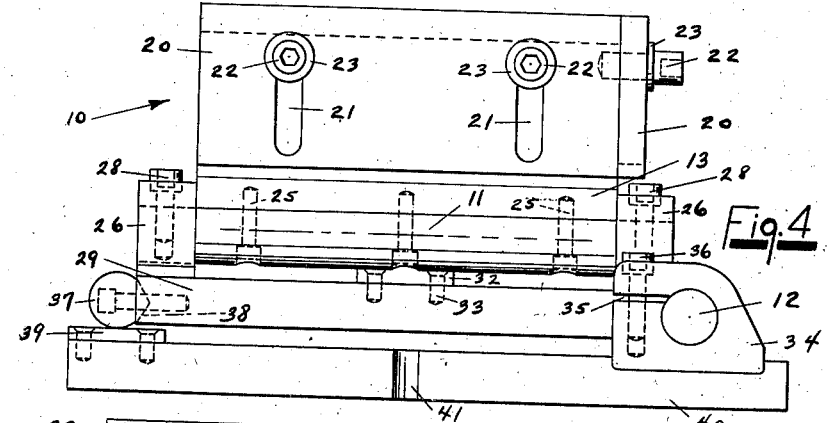
Fig. 4 is an end elevation taken from the right end of Fig. 1.

A similar arrangement is provided to tilt the table 10 in the opposite direction and make possible the use of compound angles, when necessary. As shown in Figs. 3 and 4, a roller 12 is bolted to the rear edge of the intermediate base 29, being positioned in a V shaped groove (not shown) formed in said base. The extended ends of the roller 12 are pivoted in brackets 34 and clamped therein by means of the slots 35 and the bolts 36, in a manner identical to the brackets 26, as hereinabove described. Secured to the front edge of the base 29 is a short roller 37 having the same radius as the roller 12 and being similarly mounted in a V shaped groove 38 (Figs. 1 and 4). The roller 37 is arranged to rest upon a removable sine plate or gauge block 39 (Figs. 1, 3, and 4) in its zero angle position. Upon the insertion of additional blocks the table may be tilted to any required angle in this direction. The brackets 34 and the gauge plate 39 are fixed to the secondary base 40 which is provided with U shaped slots 41 at opposite ends to enable it to be clamped or bolted to a bench or other fixture, if desired for the sake of stability.

The setting of the table for angles in the secondary direction is done in a fashion identical with that hereinabove described with reference to the rollers 11 and 31. As before, the rollers 12 and 37 are spaced a standard distance apart, and the angle is computed from a sine table to determine the size of gauge blocks needed for that setting. When the table is raised the necessary amount, it is clamped by means of the bolts 36 in the brackets 34.

Figure 5:
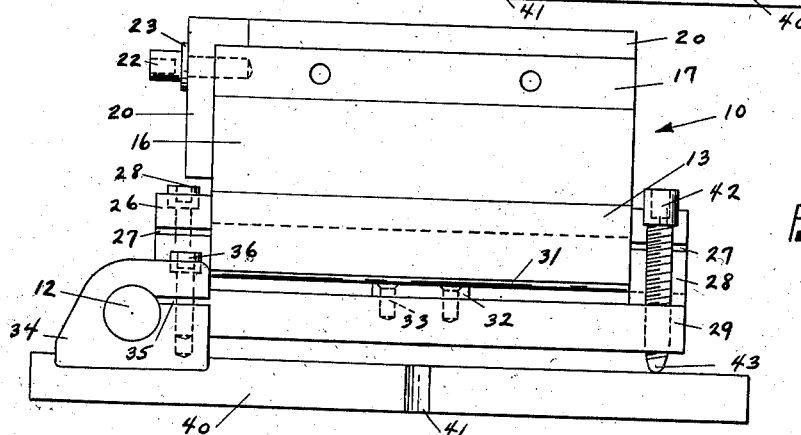
Fig. 5 is an end elevation of a slightly modified form of the device, and is viewed from the opposite end to that in Fig. 4.

In Fig. 5 I have shown a slightly modified form of my invention in which the secondary angle is secured by adjusting the set screw 42, the latter being threadedly engageable with the intermediate base 29 and having a ball shaped point 43 adapted to rest upon the secondary base 40. To effect the setting of the table at angles in the secondary direction it is only necessary to turn the screw 42 by means of a wrench until the base 29 has pivoted about the pivot roller 12 to the proper angle. The angle in the longitudinal direction is obtained by gauge blocks, as described before.

The novelty of my invention and the resulting advantages, are derived largely from the combination hereinabove described, wherein the functions of a magnetic chuck are combined with an accurate and convenient method for setting the table at simple and compound angles. If desired, my device can be built to laboratory standards and becomes a precision instrument of the highest degree. For commercial purposes the device can be made as accurate as desired and will prove to be a great time saver and an efficient machine.

It will be obvious, that while a specific embodiment of my invention has been illustrated and described herein, various changes in the details of construction may be resorted to without departing from the spirit and scope of the invention, and to this end reservation is made to make such changes as may come within the purview of the appended claims.

What I claim as my invention is:

1. In combination with a magnetic table, an offset in the bottom of said table, a cylindrical member secured to said offset and arranged to extend beyond the edges of said table to serve as pivots, a base member having split bearings arranged to engage said pivots, means to lock said pivots in said bearings, a cylindrical member secured along one edge of said base member, the ends of said last-named cylindrical member being arranged to serve as pivots for said base, a sub-base member having split bearings arranged to engage the pivots of said base, and means for locking said pivots in said bearings.

2. In combination with a magnetic table having a base and a sub-base, pivots fixed to said table and said base, the respective pivots of said table and said base being positioned at right angles to each other, said pivots being of substantial diameter and arranged to engage split bearings carried on said base and said sub-base, said bearings being provided with means to tighten them around said pivots, and lock said pivots against rotation.

3. In combination, a table, means on the table for holding a work-piece, parallel supporting members for the table, one of said members forming a pair of pivots, a base, bearings on said base and having clamping means for adjustably clamping said pivots, said base allowing free access to the table beneath the other supporting member, parallel supporting members for the base, one of said members forming a second pair of pivots, a sub-base and bearings on sub-base and having clamping means for adjustably clamping said last named pivots, said sub-base allowing free access to the base beneath its other supporting member.

OMER E. ROBBINS.